United States Patent
Phelan

(10) Patent No.: US 12,231,157 B2
(45) Date of Patent: Feb. 18, 2025

(54) CELL PHONE WATER BOTTLE HOLDER

(71) Applicant: Maxwell Corey Phelan, Canyon Lake, CA (US)

(72) Inventor: Maxwell Corey Phelan, Canyon Lake, CA (US)

( * ) Notice: Subject to any disclaimer, the term of this patent is extended or adjusted under 35 U.S.C. 154(b) by 406 days.

(21) Appl. No.: 17/844,867

(22) Filed: Jun. 21, 2022

(65) Prior Publication Data

US 2022/0407553 A1    Dec. 22, 2022

Related U.S. Application Data

(60) Provisional application No. 63/213,074, filed on Jun. 21, 2021.

(51) Int. Cl.
*H04B 1/3877* (2015.01)
*H04M 1/04* (2006.01)

(52) U.S. Cl.
CPC ............ *H04B 1/3877* (2013.01); *H04M 1/04* (2013.01)

(58) Field of Classification Search
CPC .............................. H04B 1/3877; H04M 1/04
See application file for complete search history.

(56) References Cited

U.S. PATENT DOCUMENTS

| | | | |
|---|---|---|---|
| 2012/0046083 A1* | 2/2012 | Klett | H04B 1/385 455/575.6 |
| 2019/0191853 A1* | 6/2019 | Carter | A45F 3/14 |
| 2022/0055798 A1* | 2/2022 | Morris | B32B 7/12 |

\* cited by examiner

*Primary Examiner* — Fred A Casca

(57) ABSTRACT

The present invention has a band and a phone holder. The band is a flexible strap that wraps and secures around a water bottle. The phone holder is a rectangular shaped member that secures a phone to a water bottle. The band has a plurality of hook and loop fasteners, a base, a top loop, a recessed pocket, a side pocket, and a band backing. The base is a structural support for the phone holder. The recessed pocket is in the back of the band and the side pocket is a pouch along the outside of the front of the band. The band backing is a non-slip material that covers the back of the band. The phone holder has a web case and a phone holder fastener. The web case is a flexible material that extends outwards wrapping around a cell phone.

16 Claims, 5 Drawing Sheets

CELL PHONE WATER BOTTLE HOLDER

FIELD OF THE INVENTION

The present invention relates generally to water bottle accessories. To be more specific, this invention pertains to a water bottle strap that fastens a cell phone and other accessories to a water bottle.

BACKGROUND OF THE INVENTION

In the art of exercise or being active, there are several items that an individual generally keeps very close by or with them at all times. These items include a water bottle, cell phone, wallet and keys or a variation of these items. These items provide hydration, communication and music, home entry, transportation, and money, everything an individual would need for an outing or trip to the gym.

Traditionally these items are kept in a bag, purse, pocket or carried in your hands. The problem is that these items can be heavy, difficult to carry and restrain you from exercising or moving efficiently. Often these items are left on the ground at the gym or stored in a bag in a locker room. Items left on the ground are exposed and unsafe while leaving a bag in a locker room takes additional time, is not always safe, and does not allow quick access to your cell phone or to music.

Current water bottle accessories are not designed with all the necessary features to safely secure all the items stated above. They do not have an apparatus for your keys. They do not have a slot for your cards, and they do not allow quick access to your phone screen. They often cover the phone entirely blocking access to your phone screen and making answering calls difficult. Therefore, what is clearly needed is a product that solves the combined previously mentioned problems.

DETAIL DESCRIPTIONS OF THE INVENTION

All illustrations of the drawings are for the purpose of describing selected versions of the present invention and are not intended to limit the scope of the present invention.

Figure 1:
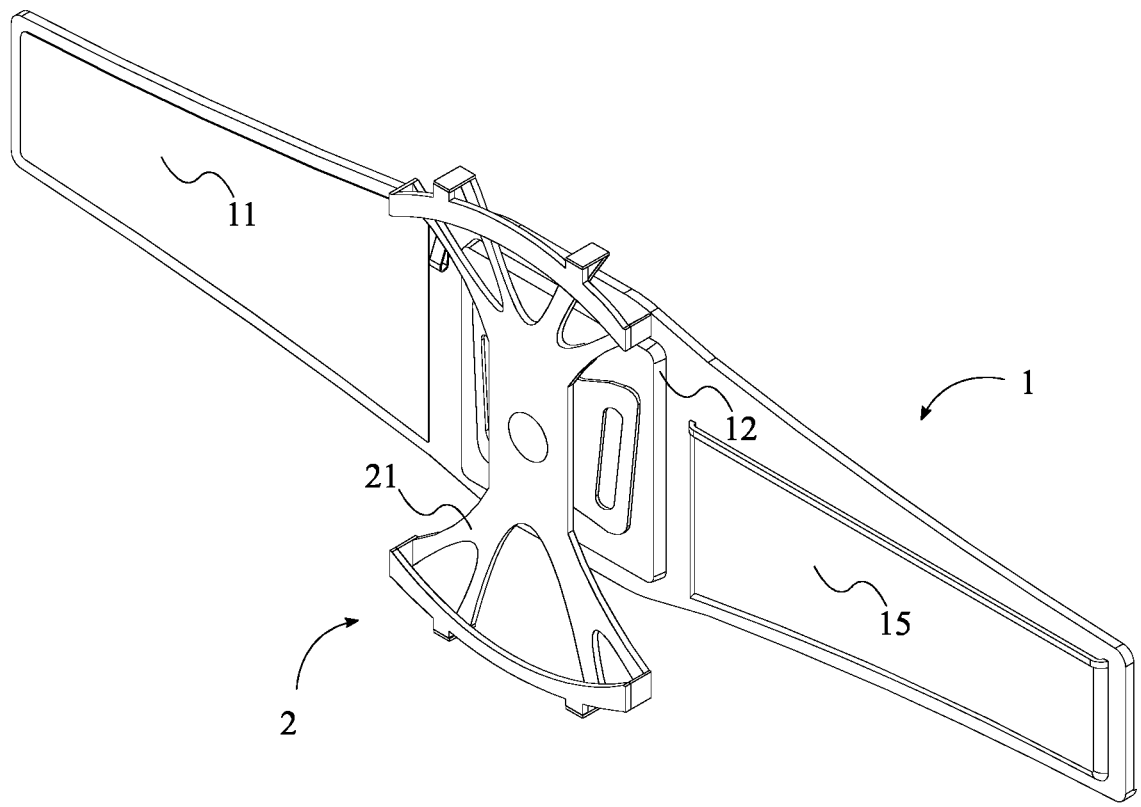
FIG. 1 is a front perspective view of the present invention.
Figure 5:
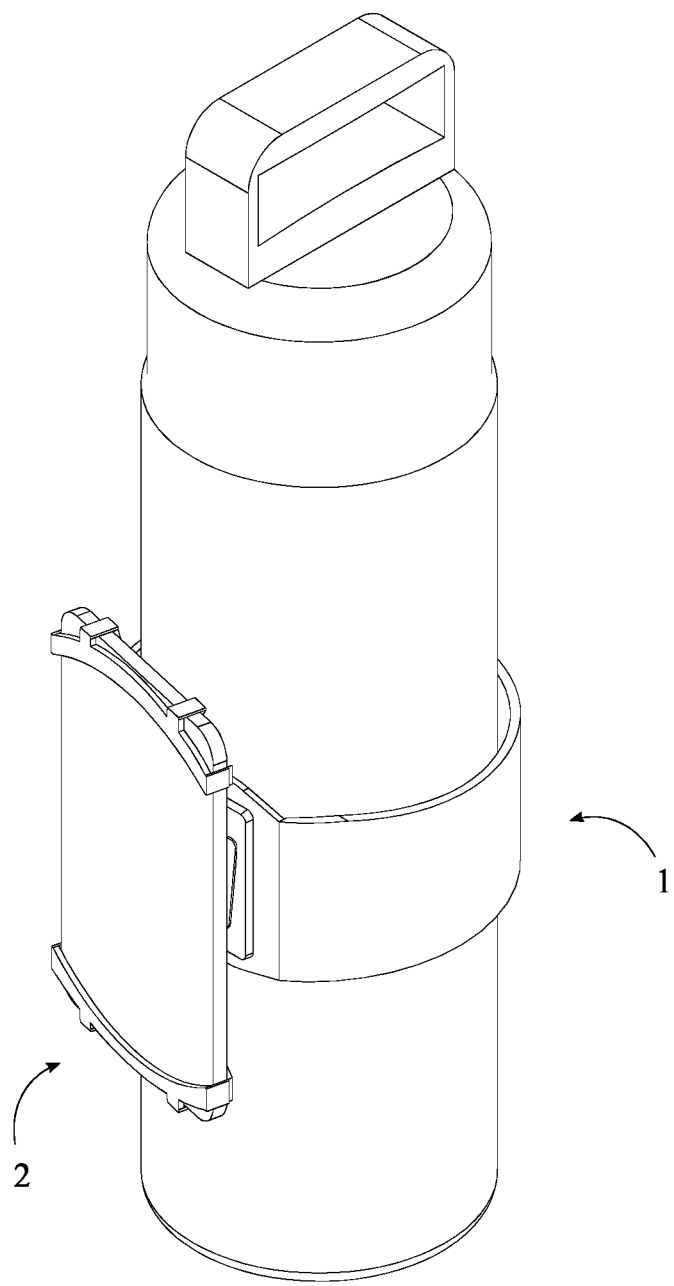
FIG. 5 is a perspective view of the present invention wrapped around a water bottle.

The preferred embodiment of the present invention comprises a band 1 and a phone holder 2. The band 1 is a flexible strap that wraps and secures around an external object made of a flexible neoprene material, preferably a water bottle. The phone holder 2 is a rectangular shaped member that secures a phone or portable electronic device to a water bottle or other external object made of a flexible silicone material. The band 1 comprises a plurality of hook and loop fasteners 11, a base 12, a top loop 13, a recessed pocket 14, a side pocket 15, and a band backing 16. The base 12 is a rectangular shaped section that structurally supports the phone holder 2. The recessed pocket 14 traverses into the band 1 material while the side pocket 15 is an external pouch along the outside of the band 1. The band backing 16 is a non-slip material that covers one side of the band 1. The phone holder 2 comprises a web case 21 and a phone holder fastener 22. The web case 21 is a flexible material that extends outwards securing the edges of a cell phone or other electronic device. The band 1 is a flexible material. As a result, the band 1 easily wraps around an external object as shown in FIG. 5. The plurality of hook and loop fasteners 11 is terminally connected to the band 1. Consequently, the plurality of hook and loop fasteners 11 can fasten to each other once the band 1 is wrapped around an external object, securing the band 1 in place. The plurality of hook and loop fasteners 11 secures the band 1 around an external object. Accordingly, the plurality of hook and loop fasteners 11 allows the present invention to be hold onto a cylindrical shaped object. The phone holder 2 is a plastic material. Thus, the phone holder 2 secures a phone or electronic device to the band 1 as seen in FIG. 1.

Figure 3:
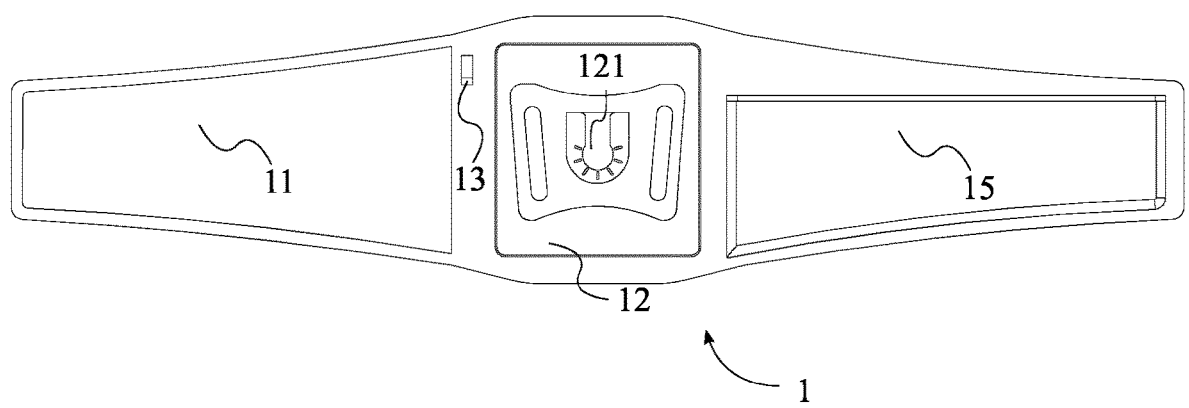
FIG. 3 is a front view of the band 1.

In reference to FIG. 3, the base 12 is positioned centrally on the band 1. So, the base 12 does not interfere when the band 1 wraps around an external object. The base 12 is designed with a sturdy plastic material. As a result, the base 12 properly creates a structural support area. The base 12 further comprises a phone holder socket 121.

In reference to FIG. 3, the phone holder socket 121 is a circular shaped recess. Consequently, the phone holder socket 121 allows for rotational movement. The phone holder socket 121 receives the phone holder fastener 22 of the phone holder 2. Accordingly, the phone holder fastener 22 is positioned within the phone holder socket 121, making the phone holder 2 attached to the band 1. The phone holder socket 121 secures the phone holder 2 to the band 1. Thus, the phone holder socket 121 is a fastening point for the phone holder 2. The phone holder socket 121 allows for the phone holder 2 to rotate within the base 12. So, the phone holder 2 rotates to be secured in various orientations within the phone holder socket 121.

Further, the top loop 13 is fastened to the band 1. As a result, the top loop 13 extends outwards from the band 1. The top loop 13 is positioned adjacent to the base 12. Consequently, the top loop 13 does not contact or overlap the base 12 area as shown in FIG. 1. The top loop 13 is positioned above the phone holder socket 121 along the band 1. Accordingly, the top loop 13 stays positioned over top the phone holder socket 121.

Figure 2:
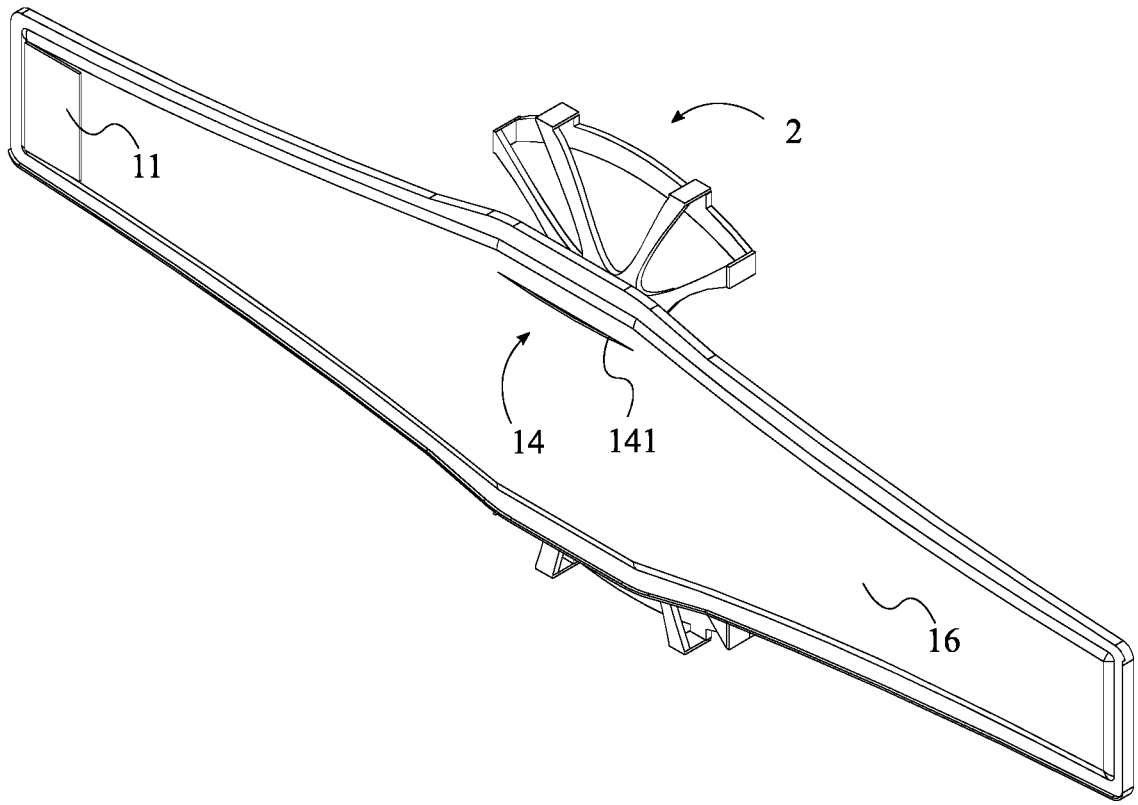
FIG. 2 is a rear perspective view of the present invention.

In reference to FIG. 2, the recessed pocket 14 is integrated into the band 1. Thus, the recessed pocket 14 cannot be seen externally. The recessed pocket 14 is positioned opposite the base 12. So, the recessed pocket 14 is not blocked by the base 12. The recessed pocket 14 comprises a slit opening 141. the slit opening 141 traverses horizontally along the band 1. As a result, the slit opening 141 opens downwards into the recessed pocket 14.

Furthermore, the side pocket 15 is positioned along the band 1. Consequently, the side pocket 15 is accessible along the outside of the band 1. The side pocket 15 is positioned adjacent to the base 12 shown in FIG. 1. Accordingly, the side pocket 15 does not overlap with the base 12. The side pocket 15 is a stretchy material. Thus, the side pocket 15 can expand in size to accommodate and hold bulky items.

In reference to FIG. 2, the band backing 16 is positioned along the band 1. So, the band backing 16 covers most of one side of the band 1. The band backing 16 is positioned opposite the base 12. As a result, the band backing 16 is on the side of the band 1 that does not contain the base 12. The band backing 16 is a material with a high coefficient of friction. Consequently, the band backing 16 does not slip easily when in contact with external surfaces. The band backing 16 limits movement when the band 1 wraps around an object. Accordingly, the band backing 16 does not slip and stays relatively in place when secured around an external object.

Figure 4:
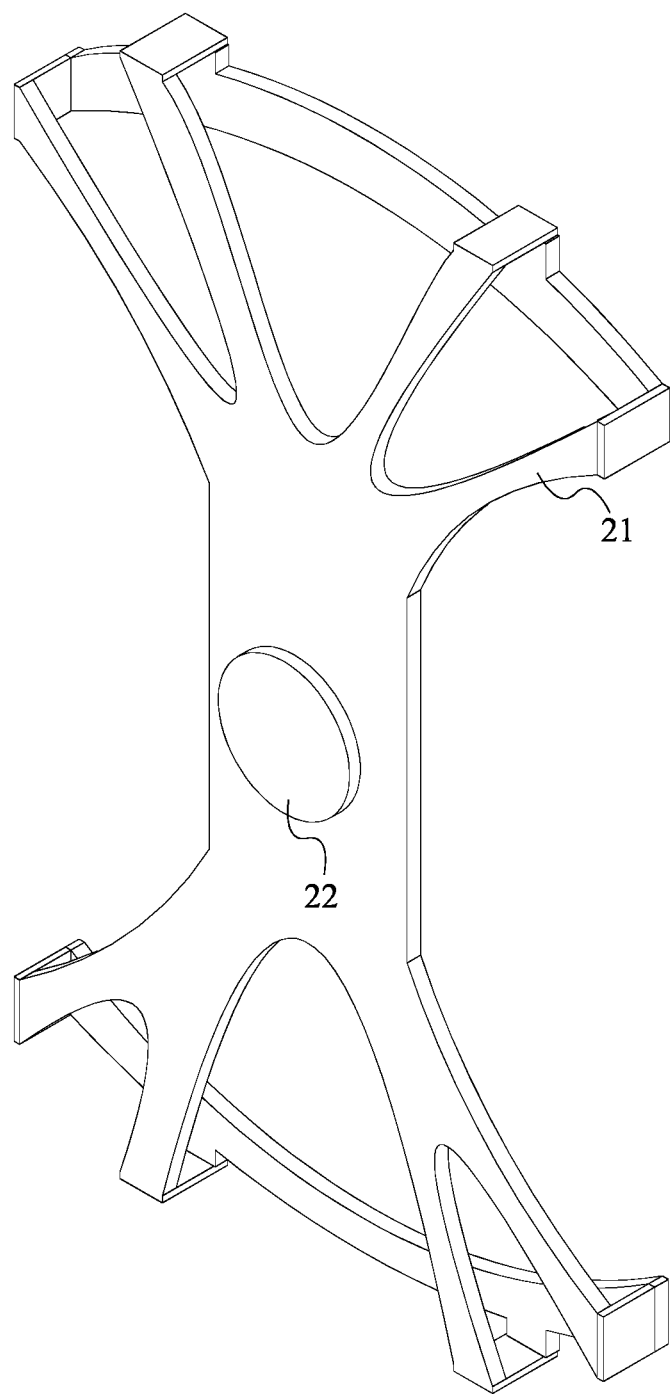
FIG. 4 is a rear perspective view of the phone holder 2.

Furthermore, the web case 21 is a flexible material. Thus, the web case 21 accommodates various sized phones and electronic devices with a flexible silicone material. The web case 21 traverses to the edges of the phone holder 2. So, the web case 21 secures the corners of a phone or electronic device providing four areas of security. The phone holder fastener 22 is positioned centrally on the phone holder 2. As seen in FIG. 4, the phone holder fastener 22 provides a central fastening point and rotational point for the phone holder 2. The phone holder fastener 22 has a circular shape. Consequently, the phone holder fastener 22 easily rotates unrestrictedly within the phone holder 2 socket 121.

Although the invention has been explained in relation to its preferred embodiment, it is to be understood that many other possible modifications and variations can be made without departing from the spirit and scope of the invention as hereinafter claimed.

What is claimed is:

1. A cell phone water bottle holder comprising:
   a band;
   a phone holder;
   the band comprising a plurality of hook and loop fasteners, a base, a top loop, a recessed pocket, a side pocket, and a band backing;
   the phone holder comprising a web case and a phone holder fastener;
   the web case being a flexible material;
   the web case traversing to the edges of the phone holder;
   the band being a flexible material;
   the plurality of hook and loop fasteners being terminally connected to the band;
   the plurality of hook and loop fasteners securing the band around an external object; and
   the phone holder being a plastic material-;
   the phone holder fastener being positioned centrally on the phone holder; and
   the phone holder fastener having a circular shape.

2. The cell phone water bottle holder as claimed in claim 1 comprising:
   the base being positioned centrally on the band;
   the base being designed with a sturdy plastic material; and
   the base further comprising a phone holder socket.

3. The cell phone water bottle holder as claimed in claim 2 comprising:
   the phone holder socket being a circular shaped recess;
   the phone holder socket receiving the phone holder fastener of the phone holder;
   the phone holder socket securing the phone holder to the band; and
   the phone holder socket allowing for the phone holder to rotate within the base.

4. The cell phone water bottle holder as claimed in claim 1 comprising:
   the top loop being fastened to the band;
   the top loop being positioned adjacent to the base; and
   the top loop being positioned above the phone holder socket along the band.

5. The cell phone water bottle holder as claimed in claim 1 comprising:
   the recessed pocket being integrated into the band; and
   the recessed pocket being positioned opposite the base.

6. The cell phone water bottle holder as claimed in claim 5 comprising:
   the recessed pocket comprising a slit opening; and
   the slit opening traversing horizontally along the band.

7. The cell phone water bottle holder as claimed in claim 1 comprising:
   the side pocket being positioned along the band;
   the side pocket being positioned adjacent to the base; and
   the side pocket being a stretchy material.

8. The cell phone water bottle holder as claimed in claim 1 comprising:
   the band backing being positioned along the band;
   the band backing being positioned opposite the base;
   the band backing being a material with a high coefficient of friction; and
   the band backing limiting movement when the band wraps around an object.

9. The cell phone water bottle holder as claimed in claim 1 comprising:
   the web case being a flexible material;
   the web case traversing to the edges of the phone holder;
   the phone holder fastener being positioned centrally on the phone holder, and
   the phone holder fastener having a circular shape.

10. A cell phone water bottle holder comprising:
    a band;
    a phone holder:
    the band comprising a plurality of hook and loop fasteners, a base, a top loop, a recessed pocket, a side pocket, and a band backing;
    the phone holder comprising a web case and a phone holder fastener;
    the band being a flexible material;
    the plurality of hook and loop fasteners being terminally connected to the band;
    the plurality of hook and loop fasteners securing the band around an external object;
    the phone holder being a plastic material;
    the base being positioned centrally on the band;
    the base being designed with a sturdy plastic material; and
    the base further comprising a phone holder socket-;
    the recessed pocket being integrated into the band;
    the recessed pocket being positioned opposite the base;
    the recessed pocket comprising a slit opening; and
    the slit opening traversing horizontally along the band.

11. The cell phone water bottle holder as claimed in claim 10 comprising:
    the phone holder socket being a circular shaped recess;
    the phone holder socket receiving the phone holder fastener of the phone holder;
    the phone holder socket securing the phone holder to the band;
    the phone holder socket allowing for the phone holder to rotate within the base;
    the top loop being fastened to the band;
    the top loop being positioned adjacent to the base; and
    the top loop being positioned above the phone holder socket along the band.

12. The cell phone water bottle holder as claimed in claim 10 comprising:
    the side pocket being positioned along the band;
    the side pocket being positioned adjacent to the base;
    the side pocket being a stretchy material;
    the band backing being positioned along the band;
    the band backing being positioned opposite the base;
    the band backing being a material with a high coefficient of friction; and
    the band backing limiting movement when the band wraps around an object.

13. A cell phone water bottle holder comprising:
a band;
a phone holder:
the band comprising a plurality of hook and loop fasteners, a base, a top loop, a recessed pocket, a side pocket, and a band backing;
the phone holder comprising a web case and a phone holder fastener;
the band being a flexible material;
the plurality of hook and loop fasteners being terminally connected to the band;
the plurality of hook and loop fasteners securing the band around an external object;
the phone holder being a plastic material;
the base being positioned centrally on the band;
the base being designed with a sturdy plastic material;
the base further comprising a phone holder socket;
the side pocket being positioned along the band;
the side pocket being positioned adjacent to the base;
the side pocket being a stretchy material;
the band backing being positioned along the band;
the band backing being positioned opposite the base;
the band backing being a material with a high coefficient of friction;
the band backing limiting movement when the band wraps around an object;
the web case being a flexible material;
the web case traversing to the edges of the phone holder;
the phone holder fastener being positioned centrally on the phone holder; and
the phone holder fastener having a circular shape.

14. The cell phone water bottle holder as claimed in claim 13 comprising:
the phone holder socket being a circular shaped recess;
the phone holder socket receiving the phone holder fastener of the phone holder;
the phone holder socket securing the phone holder to the band;
the phone holder socket allowing for the phone holder to rotate within the base;
the top loop being fastened to the band;
the top loop being positioned adjacent to the base; and
the top loop being positioned above the phone holder socket along the band.

15. The cell phone water bottle holder as claimed in claim 13 comprising:
the recessed pocket being integrated into the band; and
the recessed pocket being positioned opposite the base.

16. The cell phone water bottle holder as claimed in claim 15 comprising:
the recessed pocket comprising a slit opening; and
the slit opening traversing horizontally along the band.

* * * * *